United States Patent
Kumar et al.

(10) Patent No.: US 8,484,506 B2
(45) Date of Patent: Jul. 9, 2013

(54) REDUNDANT ARRAY OF INDEPENDENT DISKS LEVEL 5 (RAID 5) WITH A MIRRORING FUNCTIONALITY

(75) Inventors: Ranjan Kumar, Bokaro Steel (IN); Preeti Badampudi, Karnataka (IN); Shivprasad Prajapati, Karnataka (IN)

(73) Assignee: LSI Corporation, Milpitas, CA (US)

( * ) Notice: Subject to any disclaimer, the term of this patent is extended or adjusted under 35 U.S.C. 154(b) by 253 days.

(21) Appl. No.: 12/325,149

(22) Filed: Nov. 29, 2008

(65) Prior Publication Data

US 2010/0138691 A1 Jun. 3, 2010

(51) Int. Cl.
*G06F 11/00* (2006.01)
*G06F 11/20* (2006.01)

(52) U.S. Cl.
USPC ............... 714/6.24; 714/6.23; 711/114

(58) Field of Classification Search
USPC .............. 714/6, 6.23, 6.24; 711/114
See application file for complete search history.

(56) References Cited

U.S. PATENT DOCUMENTS

| | | | | |
|---|---|---|---|---|
| 6,151,665 A * | 11/2000 | Blumenau | | 711/162 |
| 6,219,800 B1 * | 4/2001 | Johnson et al. | | 714/5.1 |
| 6,425,052 B1 * | 7/2002 | Hashemi | | 711/114 |
| 7,058,762 B2 * | 6/2006 | Patterson et al. | | 711/114 |
| 7,085,953 B1 * | 8/2006 | Hsu et al. | | 714/5.11 |
| 7,133,967 B2 * | 11/2006 | Fujie et al. | | 711/114 |
| 7,353,423 B2 * | 4/2008 | Hartline et al. | | 714/6.21 |
| 7,380,157 B2 * | 5/2008 | Brewer et al. | | 714/6.2 |
| 7,401,193 B1 * | 7/2008 | Ye et al. | | 711/162 |
| 7,418,621 B2 * | 8/2008 | Ashmore | | 714/6.2 |
| 2002/0156971 A1 * | 10/2002 | Jones et al. | | 711/114 |
| 2006/0206662 A1 * | 9/2006 | Ludwig et al. | | 711/114 |

OTHER PUBLICATIONS

RAID6 Advantages Over RAID0 and RAID5 by Gabriel Torres published Apr. 15, 2006 print version used of article found at http://www.hardwaresecrets.com/article/314.*

"So what the heck is RAID 6 anyways?" by Ryan published Nov. 20, 2007 http://ryanleonard.net/storage/.*

* cited by examiner

*Primary Examiner* — Joseph Schell
(74) *Attorney, Agent, or Firm* — Prakash Nama; Global IP Services, PLLC

(57) ABSTRACT

A redundant array of independent disks level 5 (RAID 5) with a mirroring functionality is disclosed. In one embodiment, a method for adding a mirroring functionality to a RAID 5 includes forming an array using at least three drives for storing data, creating multiple data blocks and a parity for the multiple data blocks based on the data for every $(2N-1)^{th}$ stripe of the array, and generating a mirror image of the multiple data blocks and the parity for the multiple data blocks for every $(2N-1)^{th}$ stripe to its respective $2N^{th}$ stripe of the array, where the N is an integer starting from 1.

16 Claims, 6 Drawing Sheets

REDUNDANT ARRAY OF INDEPENDENT DISKS LEVEL 5 (RAID 5) WITH A MIRRORING FUNCTIONALITY

FIELD OF TECHNOLOGY

Embodiments of the present invention relate to the field of electronics. More particularly, embodiments of the present invention relate to data management associated with a redundant array of independent disks (RAID).

BACKGROUND

Redundant Array of Independent Disks (RAID) is a technology that employs simultaneous use of two or more hard disk drives to achieve greater levels of performance, reliability, and/or larger data volume sizes. The RAID, which comes in different configurations (e.g., RAID 0, 1, 2, 3, 4, 5, 6, etc.), copies data across the physical drives (or disks) and/or performs an error correction using error detecting codes (e.g., parity bits). Accordingly, the data can be protected when a failure in one or more of the drives occurs in the RAID. For example, for a RAID 5 having drives 'A', 'B', 'C', and 'D', the data on the failed drive may be rebuilt using the remaining data and the error detecting codes (or parities).

However, the RAID 5 may not be able to recover the lost data if two or more drives are failed concurrently due to its current configuration. Furthermore, even in the case of a single drive failure, it may take a considerable time for the RAID 5 to complete the rebuild process of the failed drive(s).

SUMMARY

A redundant array of independent disks level 5 (RAID 5) with a mirroring functionality is disclosed, where data is striped across the drives of the RAID 5, thus creating blocks and parities, and where every $2N^{th}$ stripe is the mirror image of $(2N-1)^{th}$ stripe shifted by one drive. In one aspect, a method for adding a mirroring functionality to a RAID 5 includes forming an array using at least three drives for storing data and creating multiple data blocks and a parity for the multiple data blocks based on the data for every $(2N-1)^{th}$ stripe of the array, where the N is an integer starting from 1. The method further includes generating a mirror image of the multiple data blocks and the parity for the multiple data blocks for every $(2N-1)^{th}$ stripe to its respective $2N^{th}$ stripe of the array. The method also includes recovering lost data of at most two failed drives of the RAID 5 based on operational drives of the RAID 5.

In another aspect, a RAID controller coupled to a host central processing unit (CPU) adds a mirroring functionality to a RAID 5 by performing a method which includes forming an array using at least three drives for storing data, creating multiple data blocks and a parity for the multiple data blocks based on the data for every $(2N-1)^{th}$ stripe of the array, and generating a mirror image of the multiple data blocks and the parity for the multiple data blocks for every $(2N-1)^{th}$ stripe to its respective $2N^{th}$ stripe of the array, where the N is an integer starting from 1.

The methods, and/or systems disclosed herein may be implemented by any means for achieving various aspects, and may be executed in a form of a machine readable medium embodying a set of instructions that, when executed by a machine, cause the machine to perform any of the operations disclosed herein.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follows.

DETAILED DESCRIPTION

A redundant array of independent disks level 5 (RAID 5) with a mirroring functionality is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1A:
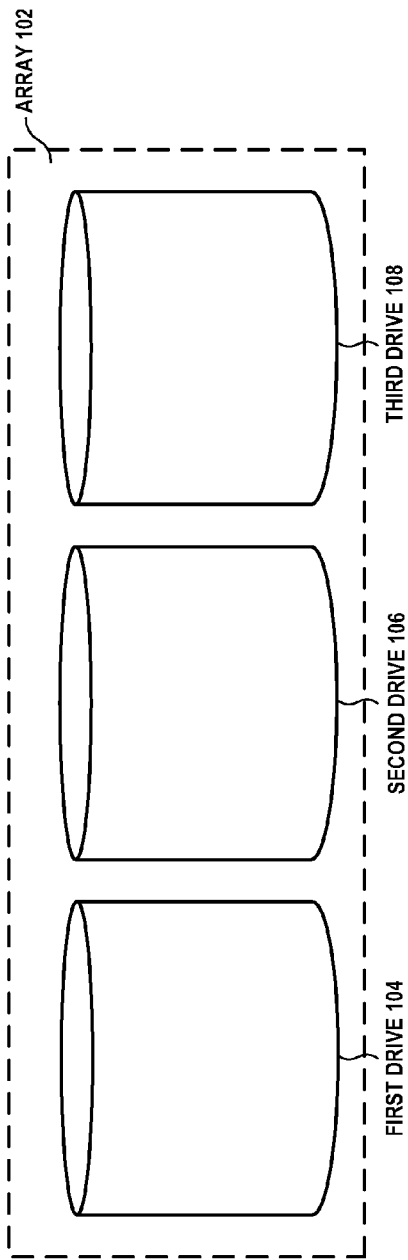
FIGS. 1A and 1B illustrate an exemplary scheme of a RAID 5 for adding a mirroring functionality to the RAID 5, according to one embodiment.
Figure 1B:
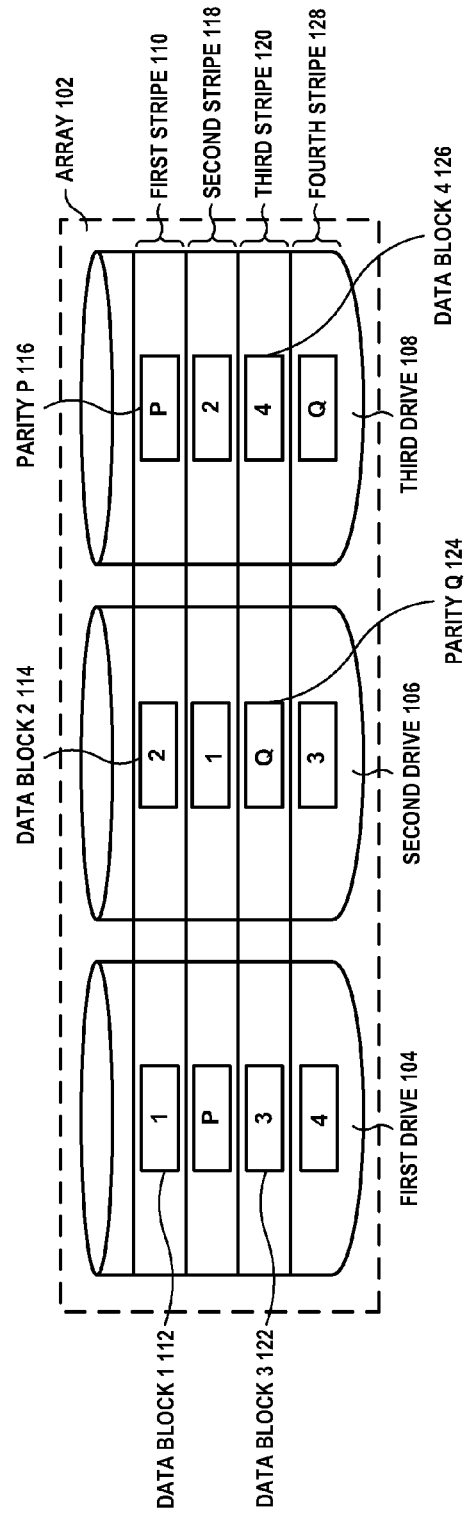

FIGS. 1A and 1B illustrate an exemplary scheme 100 of a RAID 5 for adding a mirroring functionality to the RAID 5, according to one embodiment. Particularly, FIG. 1A illustrates an array 102 formed using a first drive 104, a second drive 106 and a third drive 108 for storing data. Further, FIG. 1B illustrates a process of adding the mirroring functionality to the RAID 5. It can be seen from FIG. 1B that, the data is striped across the first drive 104, the second drive 106 and the third drive 108 of the array 102. As shown in FIG. 1B, the array 102 includes four stripes, viz., a first stripe 110, a second stripe 118, a third stripe 120 and a fourth stripe 128.

Further, as shown in FIG. 1B, a data block 1 112, a data block 2 114 and a parity P 116 are created for the first stripe 110 of the array 102. Furthermore, a mirror image of the first stripe 110 (e.g., the data block 1 112, the data block 2 114 and the parity P 116) is generated to its respective second stripe 118 of the array 102. As shown in FIG. 1B, the mirror image is generated in such a way that each data block in the second stripe 118 is shifted by one drive from the first stripe 110.

Similarly, a data block 3 122, a parity Q 124 and a data block 4 126 are created for the third stripe 120 of the array 102. Further, a mirror image of the third stripe 120 (e.g., the data block 3 122, the parity Q 124 and the data block 4 126) is generated to the respective fourth stripe 128 of the array 102. As shown in FIG. 1B, the mirror image is generated in such a way that each data block in the fourth stripe 128 is shifted by one drive from the third stripe 120.

Figure 2A:
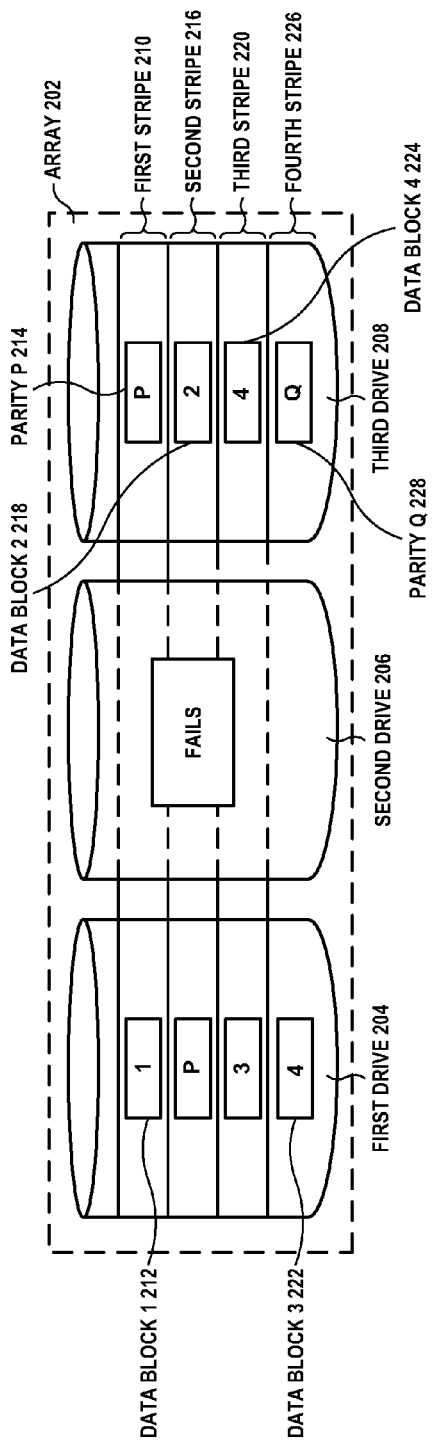
FIGS. 2A and 2B illustrate an exemplary process of recovering lost data based on the RAID 5 scheme of FIGS. 1A and 1B in case of a single drive failure, according to one embodiment.
Figure 2B:
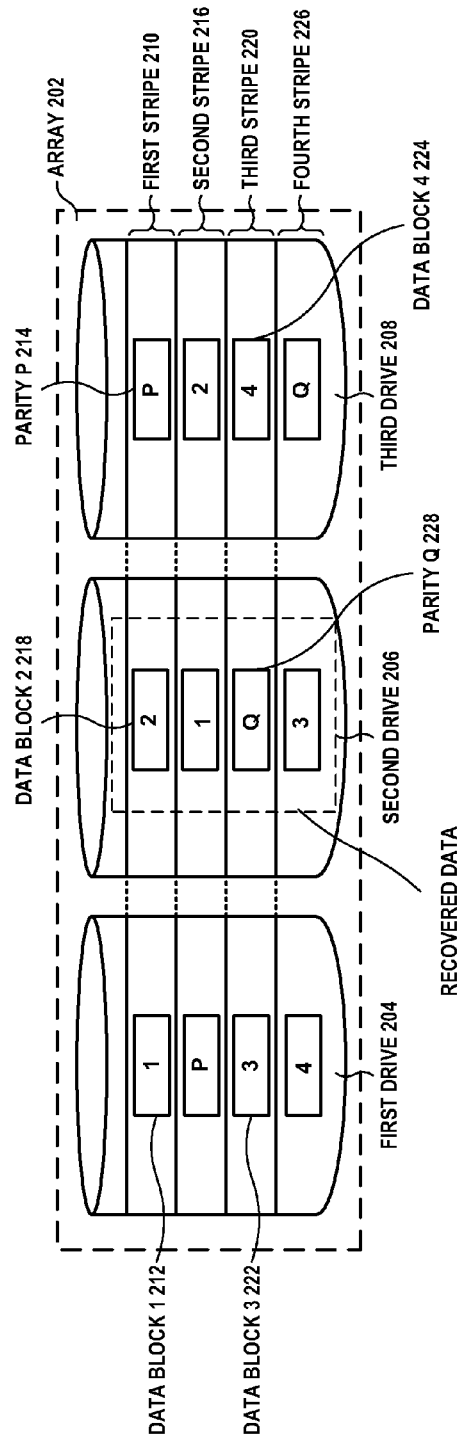

FIGS. 2A and 2B illustrate an exemplary process 200 of recovering lost data based on the RAID 5 scheme of FIGS. 1A and 1B in case of a single drive failure, according to one embodiment. Particularly, FIG. 2A illustrates an array 202 with two operational drives, viz., a first drive 204 and a third drive 208, and a single failed drive, viz., a second drive 206. It is appreciated that the array 202 is an exemplary embodiment of the array 102 of FIG. 1B. As shown in FIG. 2A, data in the array 202 is striped to form a first stripe 210, a second stripe 216, a third stripe 220 and a fourth stripe 226. It is appreciated that the second stripe 216 is a mirror image of the first stripe 210 and the fourth stripe 226 is a mirror image of the third stripe 220.

Further, as shown in FIG. 2A, the first stripe 210 includes a data block 1 212 and a parity P 214 and the second stripe 216 includes the parity p 214 and a data block 2 218. Furthermore, as shown in FIG. 2A, the third stripe 220 includes a data block 3 222 and a data block 4 224 and the fourth stripe 226 includes the data block 4 224 and a parity block Q 228. However, it can be seen from FIG. 2A that, the first stripe 210, the second stripe 216, the third stripe 220 and the fourth stripe 226 misses the data block 2 218, the data block 1 212, the parity Q 228 and the data block 3 222, respectively, as the second drive 206 of the array 202 suffers a failure. As will be illustrated in FIG. 2B, in case of a single drive failure, the data is still available when a read is issued, and retrieval of the missing data may not require any XOR calculation of the remaining data blocks and/or parities.

Further, FIG. 2B illustrates the process of recovering the lost data in the second drive 206 of the array 202. In one embodiment, the lost data of the second drive 206 is recovered based on the operational drives of the RAID 5 (i.e., the first drive 204 and the third drive 208). In one example embodiment, the lost data of the second drive 206 is recovered based on the data block 1 212 and the parity P 214 of the first stripe 210, the parity P 214 and the data block 2 218 of the second stripe 216, the data block 3 222 and the data block 4 224 of the third stripe 220 and the data block 224 and the parity Q 228 of the fourth stripe 226. It is appreciated that the lost data is recovered by performing a rebuild operation or by performing a copy operation. Some exemplary methods of recovery are illustrated in the paragraphs below;

In one exemplary implementation, the second drive 206 is rebuilt based on the data block 1 212 and the parity P 214 of the first stripe 210, the parity P 214 and the data block 2 218 of the second stripe 216, the data block 3 222 and the data block 4 224 of the third stripe 220 and the data block 4 224 and the parity Q 228 of the fourth stripe 226.

In another exemplary implementation, the lost data is copied to the second drive 206 from the data block 1 212 of the first stripe 210, the data block 2 218 of the second stripe 216, the data block 3 222 of the third stripe 220 and the parity Q 228 of the fourth stripe 226. Thus, as shown in FIG. 2B, the data block 2 218, the data block 1 212, the parity Q 228 and the data block 3 222 of the second drive 206 are recovered by performing the rebuild operation or the copy operation. Thus, in case of a single drive failure, the data and/or parity contained in the failed drive can be recovered by a rebuild or a normal copy operation, which is similar to a write operation.

Figure 3A:
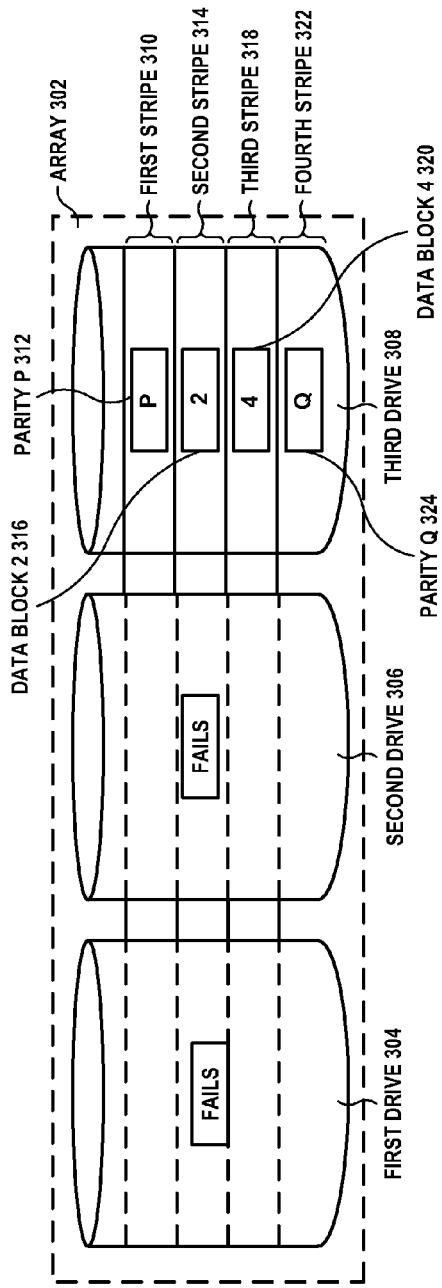
FIGS. 3A and 3B illustrate an exemplary process of recovering lost data based on the RAID 5 scheme of FIGS. 1A and 1B in case of double drive failures, according to one embodiment.
Figure 3B:
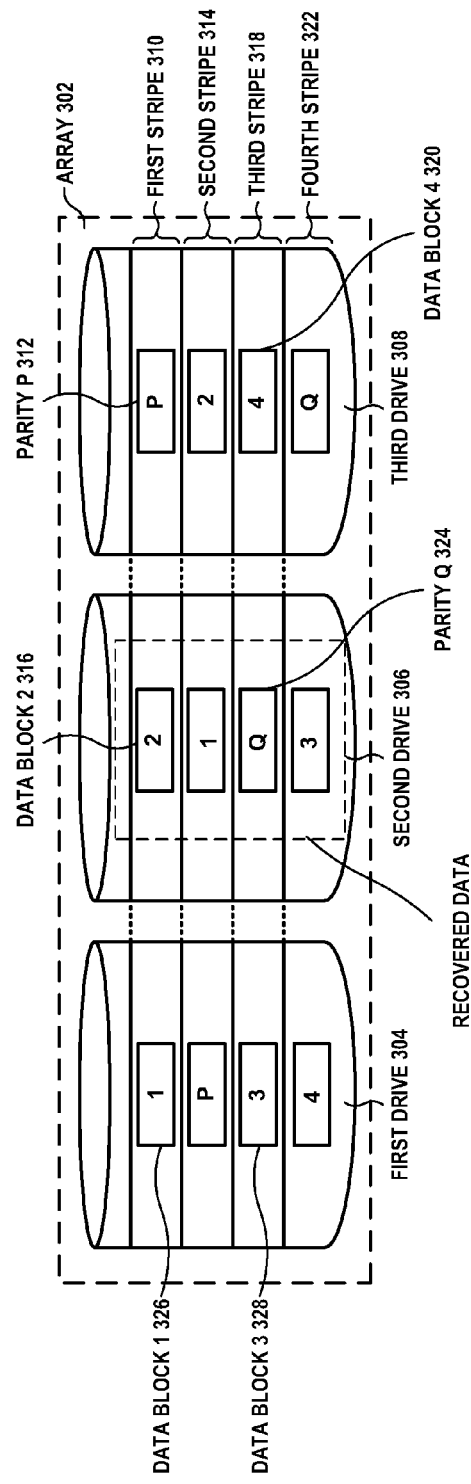

FIGS. 3A and 3B illustrate an exemplary process 300 of recovering lost data based on the RAID 5 scheme of FIGS. 1A and 1B in case of double drive failures, according to one embodiment. Particularly, FIG. 3A illustrates an array 302 with two failed drives, viz., a first drive 304 and a second drive 306 and an operational drive, viz., a third drive 308. It is appreciated that the array 302 is an exemplary embodiment of the array 102 of FIG. 1B. As shown in FIG. 3A, the data is striped to form a first stripe 310, a second stripe 314, a third stripe 318 and a fourth stripe 322. It is appreciated that the second stripe 314 is a mirror image of the first stripe 310 and the fourth stripe 322 is a mirror image of the third stripe 318. Further, as shown in FIG. 3A, the first stripe 310 includes a parity P 312, the second stripe 314 includes a data block 2 316, the third stripe 318 includes a data block 4 320 and the fourth stripe 322 includes a parity Q 324, when the first drive 304 and the second drive 306 fail. As will be illustrated in FIG. 3B, in case of two failed drives, retrieval of the missing data may be available only after certain calculations are done from the available data blocks and/or parity blocks to retrieve the data and parity of the failed drives.

Further, FIG. 3B illustrates the process of recovering the lost data of the first drive 304 and the second drive 306 of the array 302. In one embodiment, the lost data is recovered from the operational drive of the RAID 5 (i.e., the third drive 308). In one example embodiment, the lost data of the first drive 304 and the second drive 306 is recovered based on the parity P 312 of the first stripe 310, the data block 2 316 of the second stripe 314, the data block 4 320 of the third stripe 318 and the parity Q 324 of the fourth stripe 322 of the third drive 308. In one exemplary implementation, the lost data of the first drive 304 and the second drive 306 are recovered by performing a rebuild operation.

It is appreciated that the first drive 304 and the second drive 306 are rebuilt based on the parity P 312 of the first stripe 310, the data block 2 316 of the second stripe 314, the data block 4 320 of the third stripe 318 and the parity Q 324 of the fourth stripe 322 of the third drive 308. Thus, as shown in FIG. 3B, a data block 1 326, the parity P 312, a data block 3 328 and the data block 4 320 of the first drive 304 are recovered by performing the rebuild operation. Also, as shown in FIG. 3B, the data block 2 316, the data block 1 326, the parity Q 324 and the data block 3 328 of the second drive 306 are recovered by performing the rebuild operation. Thus, in case of two failed drives, the data and/or parity in the failed drives may be recovered by a rebuilding process, which is similar to a write operation. In another embodiment, one of the two failed drives can be rebuilt and the other failed drive can be recovered using a normal copy operation.

Figure 4:
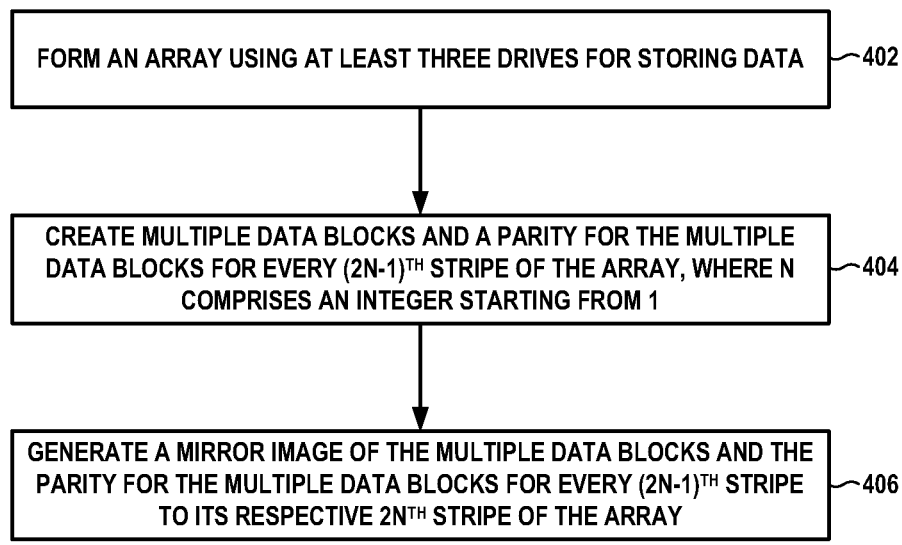
FIG. 4 is a process flow chart of an exemplary method for adding a mirroring functionality to the RAID 5, according to one embodiment.

FIG. 4 is a process flow chart 400 of an exemplary method for adding a mirroring functionality to a RAID 5, according to one embodiment. In operation 402, an array is formed using at least three drives for storing data. In operation 404, multiple data blocks and a parity for the multiple data blocks are created based on the data for every $(2N-1)^{th}$ stripe of the array, where, the N is an integer starting from 1. In operation 406, a mirror image of the multiple data blocks and the parity for the multiple data blocks for every $(2N-1)^{th}$ stripe is generated to its respective $2N^{th}$ stripe of the array. Moreover, in one example embodiment, a computer readable medium (e.g., firmware for an I/O processor and/or a controller associated with the RAID 5) for adding the mirroring functionality to the RAID 5 that, when executed by a computer, cause the computer to perform the method illustrated in FIG. 4.

Figure 5:
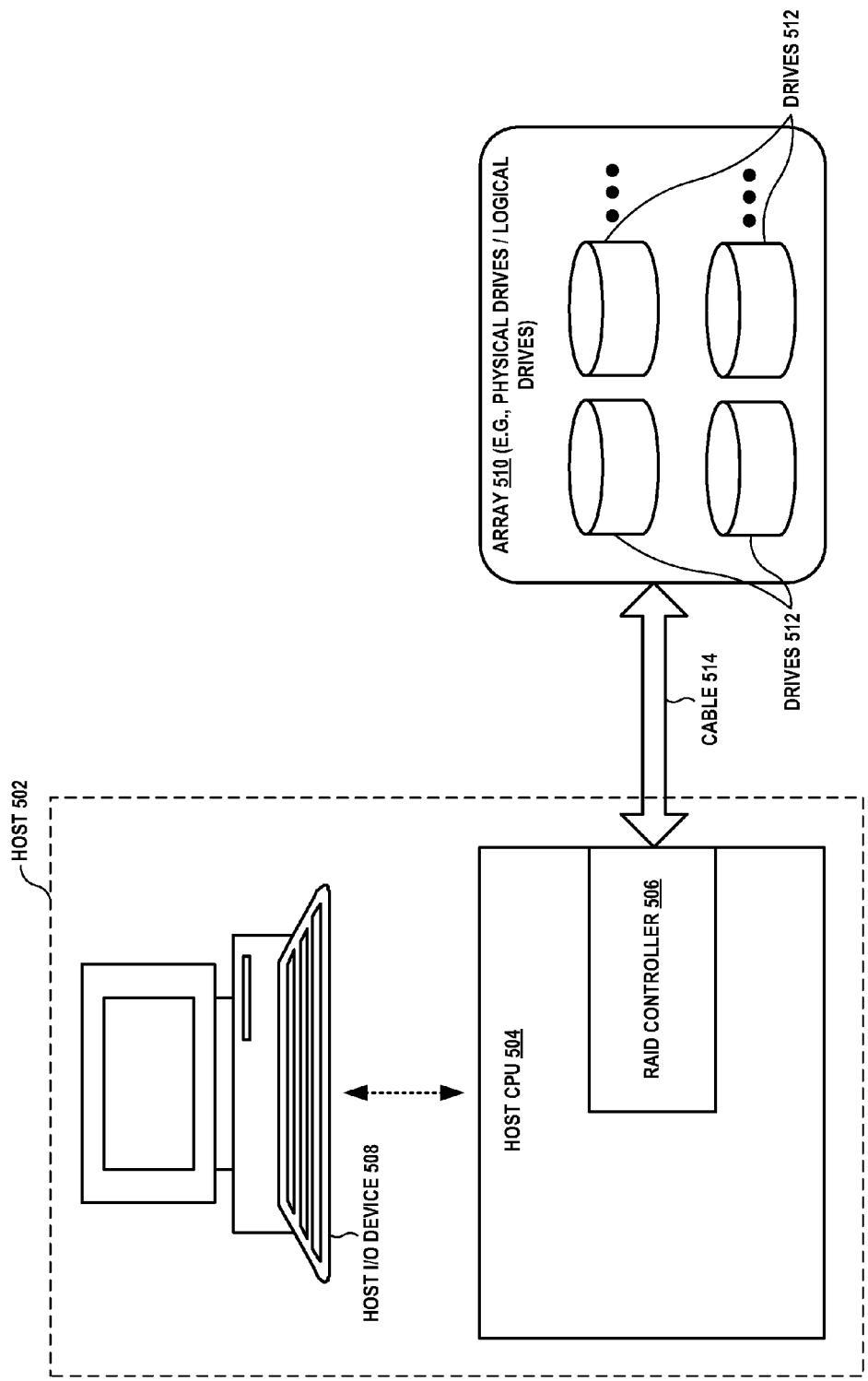
FIG. 5 is a block diagram of an exemplary direct attached storage (DAS) which implements the method illustrated in FIG. 4, according to one embodiment.

FIG. 5 is a block diagram of an exemplary direct attached storage (DAS) 500 which implements the method illustrated in FIG. 4, according to one embodiment. As shown in FIG. 5, the DAS 500 includes a host 502 and an array 510 (e.g., including physical drives or logical drives). Further, as shown in FIG. 5, the host 502 includes a central processing unit (CPU) 504 and a host input/output (I/O) device 508. Also, as shown in FIG. 5, a RAID controller 506 is coupled to the host CPU 504 for adding a mirroring functionality to a RAID 5. Furthermore, as shown in FIG. 5, the host I/O device 508 is coupled to the host CPU 504.

Also, as shown in FIG. 5, the array 510 includes multiple drives 512 for storing data. It is appreciated that the array 510 is an exemplary embodiment of the array 102 of FIGS. 1A and 1B, the array 202 of FIGS. 2A and 2B and the array 302 of FIGS. 3A and 3B, respectively. Moreover, as shown in FIG. 5, the array 510 is coupled to the host CPU 504 in the DAS 500 via a cable 514 (e.g., SCS, FC, SAS, etc.).

In operation, the RAID controller 506 is operable for forming the array 510 using at least three drives 512 for storing data. Further, the RAID controller 506 is operable for creating multiple data blocks and a parity for the multiple data blocks based on the data for every $(2N-1)^{th}$ stripe of the array 510, where, the N is an integer starting from 1. Furthermore, the RAID controller 506 is operable for generating a mirror image of the multiple data blocks and the parity for the multiple data blocks for every $(2N-1)^{th}$ stripe to its respective $2N^{th}$ stripe of the array 510.

Figure 6:
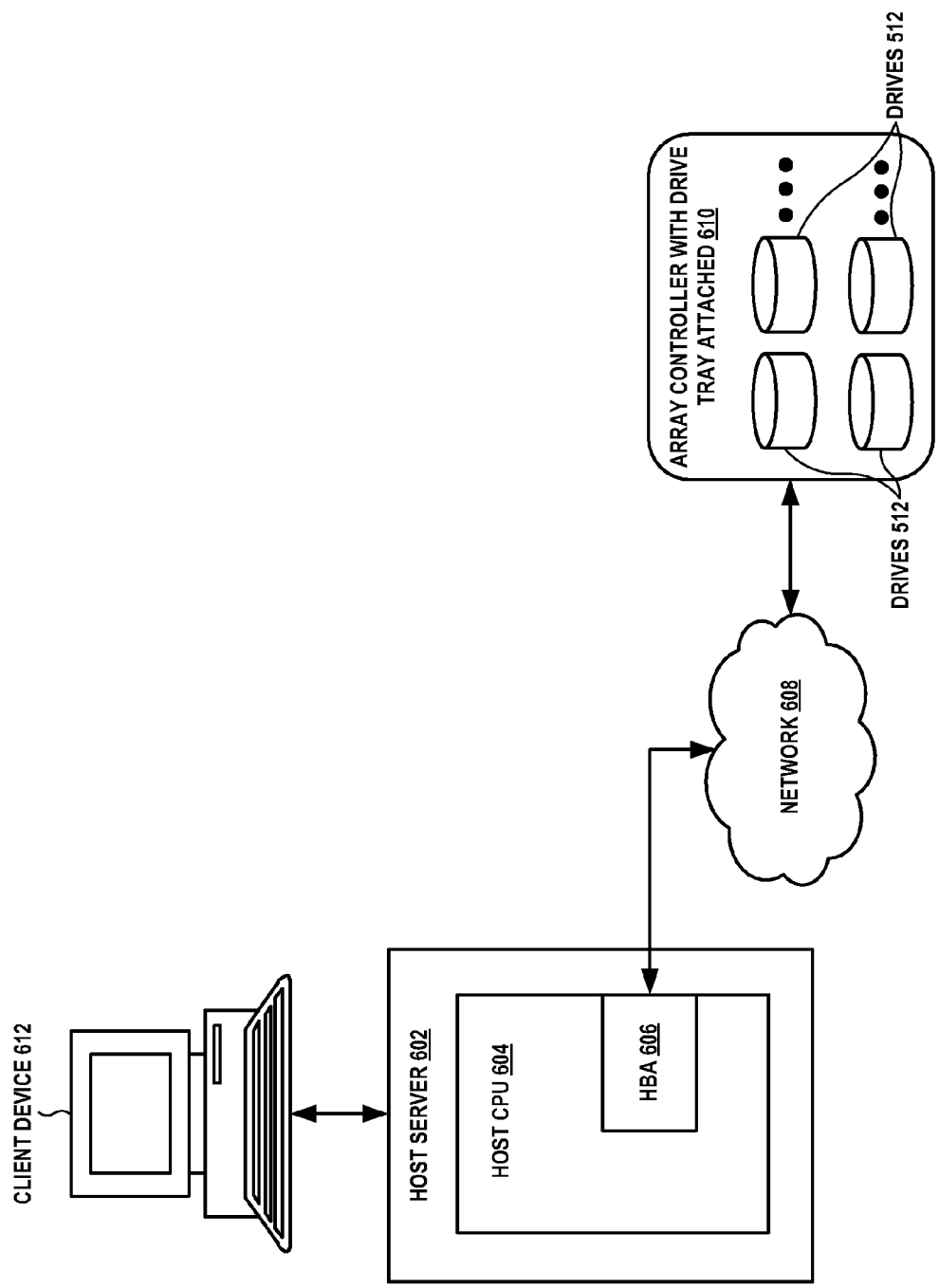
FIG. 6 is a block diagram of an exemplary storage area network (SAN) which implements the method illustrated in FIG. 4, according to one embodiment.

FIG. 6 is a block diagram of an exemplary storage area network (SAN) 600 which implements the method illustrated in FIG. 4, according to one embodiment. As shown in FIG. 6, the SAN 600 includes a host server 602 and an array controller with drive tray attached 610. Further, as shown in FIG. 6, the host server 602 includes a host CPU 604 and a host bus adapter (HBA) 606 (e.g., SCS, FC, SAS, etc.). In one embodiment, the HBA 606 is coupled to the host CPU 604 for adding a mirroring functionality to a RAID 5.

Furthermore, as shown in FIG. 6, the array controller with drive tray attached 610 includes multiple drives 612 which are coupled to the host CPU 604 via a network 608. Also, as shown in FIG. 6, a client device 614 is coupled to the host server 602 for accessing the host CPU 604.

In operation, the HBA 606 is operable for forming an array using at least three drives 612 for storing data. Further, the HBA 606 is operable for creating multiple data blocks and a parity for the multiple data blocks based on the data for every $(2N-1)^{th}$ stripe of the array 610, where, the N is an integer starting from 1. Moreover, the HBA 606 is operable for generating a mirror image of the multiple data blocks and the parity for the multiple data blocks for every $(2N-1)^{th}$ stripe to its respective $2N^{th}$ stripe of the array 610.

The above-described RAID scheme provides 100% protection of stored data. Further, the above-described RAID scheme can withstand up to two drive failures, thereby ensuring high data availability or redundancy and high performance. Further, the above-described RAID scheme provides a good aggregate transfer rate, a high read data transaction rate and a medium write data transaction rate.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for adding a mirroring functionality to a RAID 5, comprising:
   forming an array using at least three drives for storing data;
   creating a plurality of data blocks and a parity for the plurality of data blocks based on the data for every $(2N-1)^{th}$ stripe of the array, wherein every $(2N-1)^{th}$ stripe is associated with a succeeding $2N^{th}$ stripe as its respective $2N^{th}$ stripe;
   generating a mirror image of the plurality of data blocks and the parity for the plurality of data blocks for every $(2N-1)^{th}$ stripe to its respective $2N^{th}$ stripe of the array, wherein the N comprises an integer starting from 1, wherein the generating the mirror image of the plurality of data blocks and the parity comprises shifting each of the plurality of data blocks and the parity for the plurality of data blocks in every $2N^{th}$ stripe by one drive from the $(2N-1)^{th}$ stripe; and
   recovering lost data based on the plurality of data blocks and the parity for the plurality of data blocks for every $(2N-1)^{th}$ stripe and its respective $2N^{th}$ stripe of operational drives of the RAID 5 if the RAID 5 comprises a single failed drive.

2. The method of claim 1, further comprising recovering lost data of at most two failed drives of the RAID 5 based on operational drives of the RAID 5.

3. The method of claim 1, further comprising recovering lost data from operational drives of the RAID 5 if two drives of the RAID 5 fail.

4. The method of claim 1, wherein the recovering the lost data comprises rebuilding the failed drive based on the plurality of data blocks and the parity for the plurality of data blocks for every $(2N-1)^{th}$ stripe and its respective $2N^{th}$ stripe of operational drives of the RAID 5.

5. The method of claim 1, wherein the recovering the lost data comprises copying the lost data of the failed drive from a corresponding block selected from the group consisting of the plurality of data blocks and the parity for the plurality of data blocks for every $(2N-1)^{th}$ stripe and its respective $2N^{th}$ stripe of the operational drives of the RAID 5.

6. The method of claim 1, further comprising recovering lost data based on the plurality of data blocks and the parity for the plurality of data blocks for every $(2N-1)^{th}$ stripe and its respective $2N^{th}$ stripe of operational drives of the RAID 5 if the RAID 5 comprises two failed drives.

7. The method of claim 6, wherein the recovering the lost data comprises rebuilding the two failed drives based on the plurality of data blocks and the parity for the plurality of data blocks for every $(2N-1)^{th}$ stripe and its respective $2N^{th}$ stripe of operational drives of the RAID 5.

8. A non-transitory computer readable medium for adding a mirroring functionality to a RAID 5 having instructions that, when executed by a computer, cause the computer to perform a method comprising:
   forming an array using at least three drives for storing data;
   creating a plurality of data blocks and a parity for the plurality of data blocks based on the data for every $(2N-1)^{th}$ stripe of the array, wherein every $(2N-1)^{th}$ stripe is associated with a succeeding $2N^{th}$ stripe as its respective $2N^{th}$ stripe;
   generating a mirror image of the plurality of data blocks and the parity for the plurality of data blocks for every $(2N-1)^{th}$ stripe to its respective $2N^{th}$ stripe of the array, wherein the N comprises an integer starting from 1, wherein the generating the mirror image of the plurality of data blocks and the parity comprises shifting each of the plurality of data blocks and the parity for the plurality of data blocks in every $2N^{th}$ stripe by one drive from the $(2N-1)^{th}$ stripe; and recovering lost data based on the plurality of data blocks and the parity for the plurality of data blocks for every $(2N-1)^{th}$ stripe and its respective $2N^{th}$ stripe of operational drives of the RAID 5 if the RAID 5 comprises a single failed drive.

9. The non-transitory computer readable medium of claim 8, further comprising recovering lost data of at most two failed drives of the RAID 5 based on operational drives of the RAID 5.

10. The non-transitory computer readable medium of claim 8, further comprising recovering lost data from operational drives of the RAID 5 if two drives of the RAID 5 fail.

11. The non-transitory computer readable medium of claim 8, wherein the recovering the lost data comprises rebuilding the failed drive based on the plurality of data blocks and the parity for the plurality of data blocks for every $(2N-1)^{th}$ stripe and its respective $2N^{th}$ stripe of operational drives of the RAID 5.

12. The non-transitory computer readable medium of claim 8, wherein the recovering the lost data comprises copying the lost data of the failed drive from a corresponding block selected from the group consisting of the plurality of data blocks and the parity for the plurality of data blocks for every $(2N-1)^{th}$ stripe and its respective $2N^{th}$ stripe of the operational drives of the RAID 5.

13. The non-transitory computer readable medium of claim 8, further comprising recovering lost data based on the plurality of data blocks and the parity for the plurality of data blocks for every $(2N-1)^{th}$ stripe and its respective $2N^{th}$ stripe of operational drives of the RAID 5 if the RAID 5 comprises two failed drives.

14. The non-transitory computer readable medium of claim 13, wherein the recovering the lost data comprises rebuilding the two failed drives based on the plurality of data blocks and the parity for the plurality of data blocks for every $(2N-1)^{th}$ stripe and its respective $2N^{th}$ stripe of operational drives of the RAID 5.

15. A RAID controller including hardware and coupled to a host central processing unit (CPU) for adding a mirroring functionality to a RAID 5 by performing a method comprising:

forming an array using at least three drives for storing data;

creating a plurality of data blocks and a parity for the plurality of data blocks based on the data for every $(2N-1)^{th}$ stripe of the array, wherein every $(2N-1)^{th}$ stripe is associated with a succeeding $2N^{th}$ stripe as its respective $2N^{th}$ stripe;

generating a mirror image of the plurality of data blocks and the parity for the plurality of data blocks for every $(2N-1)^{th}$ stripe to its respective $2N^{th}$ stripe of the array, wherein the N comprises an integer starting from 1, wherein the generating the mirror image of the plurality of data blocks and the parity comprises shifting each of the plurality of data blocks and the parity for the plurality of data blocks in every $2N^{th}$ stripe by one drive from the $(2N-1)^{th}$ stripe; and recovering lost data based on the plurality of data blocks and the parity for the plurality of data blocks for every $(2N-1)^{th}$ stripe and its respective $2N^{th}$ stripe of operational drives of the RAID 5 if the RAID 5 comprises a single failed drive.

16. The RAID controller of claim 15, wherein the array is coupled to the host CPU in a storage area network (SAN) or a direct attached storage (DAS) architecture.

\* \* \* \* \*